United States Patent [19]

Carlson et al.

[11] Patent Number: 5,451,326

[45] Date of Patent: Sep. 19, 1995

[54] CHEMICAL TREATMENT OF FOOD PROCESSING WASTES USING DISPERSION POLYMERS

[75] Inventors: Wayne M. Carlson, Batavia; Manian Ramesh, Naperville, both of Ill.

[73] Assignee: Nalco Chemical Company, Naperville, Ill.

[21] Appl. No.: 242,913

[22] Filed: May 16, 1994

[51] Int. Cl.⁶ ............................................. C02F 1/56
[52] U.S. Cl. .................................. 210/708; 210/728; 210/734; 210/905
[58] Field of Search ............... 210/702, 725, 727, 728, 210/734, 735, 905, 609, 708

[56] References Cited

U.S. PATENT DOCUMENTS

| | | | |
|---|---|---|---|
| 4,013,555 | 3/1977 | Davis | 210/725 |
| 4,104,161 | 8/1978 | Wein | 210/905 |
| 4,609,470 | 9/1986 | Chung et al. | 210/725 |
| 4,744,904 | 5/1988 | McAninch et al. | 210/905 |
| 4,869,829 | 9/1989 | Casey | 210/706 |
| 4,929,655 | 5/1990 | Takeda et al. | 524/458 |
| 5,006,590 | 4/1991 | Takeda et al. | 524/458 |
| 5,015,391 | 5/1991 | Mohn | 210/708 |
| 5,030,359 | 7/1991 | Castrantas et al. | 210/705 |
| 5,294,347 | 3/1994 | Byrne et al. | 210/708 |
| 5,330,650 | 7/1994 | Byrne et al. | 210/708 |
| 5,332,506 | 7/1994 | Marble et al. | 210/708 |
| 5,332,507 | 7/1994 | Braden et al. | 210/708 |

FOREIGN PATENT DOCUMENTS

| | | |
|---|---|---|
| 364175A2 | 4/1990 | European Pat. Off. |
| 54-150380 | 11/1979 | Japan |
| 61-006396 | 1/1986 | Japan |
| 61-006397 | 1/1986 | Japan |
| 61-006398 | 1/1986 | Japan |
| 61-138607 | 6/1986 | Japan |
| 62-262799 | 11/1987 | Japan |

*Primary Examiner*—Peter A. Hruskoci
*Attorney, Agent, or Firm*—Robert A. Miller; James J. Drake

[57] ABSTRACT

The present invention provides a method for treating food processing wastes. Pursuant to the method, the food processing waste is treated with an effective amount of a dispersion of a water-soluble cationic polymer flocculant. In further embodiments, the method of the present invention includes the further steps of adding effective amounts of both a coagulant and flocculant in combination or separately.

7 Claims, 2 Drawing Sheets

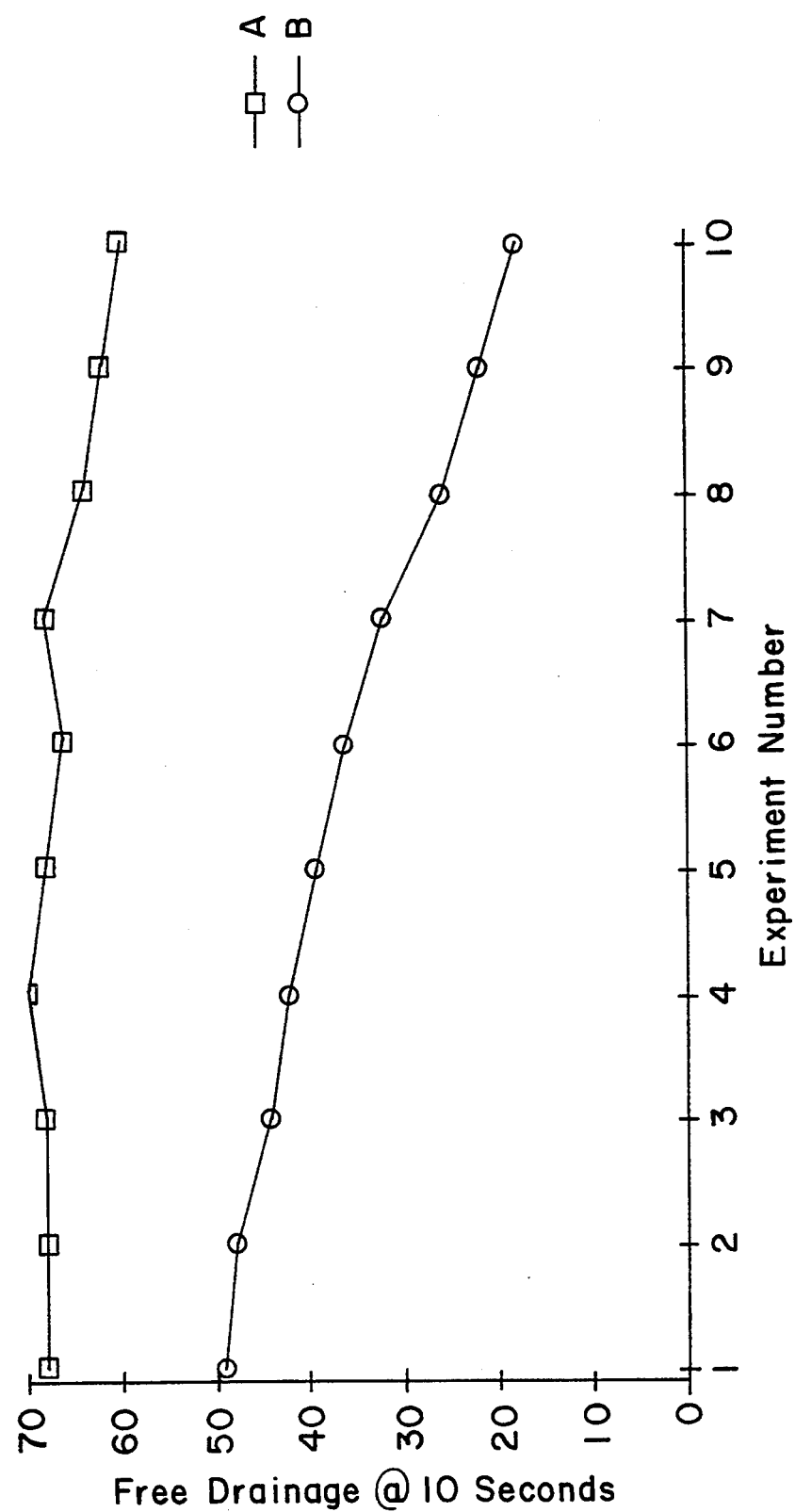

CHEMICAL TREATMENT OF FOOD PROCESSING WASTES USING DISPERSION POLYMERS

BACKGROUND OF THE INVENTION

The present invention relates generally to the treatment of food processing wastes. More particularly, the present invention provides a chemical treatment method that effectively removes fat, blood, tissue and other solids from food processing waste.

Every day the food processing industry produces many tons of food processing waste. Such food processing waste contaminates the water stream flowing through the food processing system. For example, poultry farm waste water effluents are enriched with fat, oil, blood and other solids from the poultry process. These by-products, such as fat, blood, and tissue, are typically present in the waste water in a range of several hundred to tens of thousands of ppm.

For economic as well as regulatory reasons, the food processing community faces never-ending concerns regarding the disposal and recycling of food processing waste water. The removal of such by-products is critical from an environmental standpoint. In fact, the United States Environmental Protection Agency has placed tight restrictions on total oil and solids content in water that is to be discharged into public drinking water supplies or into open bodies of water.

The removal of such solids is also critical to the established discharge limits for total dissolved solids (TDS), chemical oxygen demand (COD), biological oxygen demand (BOD) and total organic carbon (TOC) into local sewers and rivers. In addition to the EPA's severe discharge limits, food processing industries must also be concerned with local city ordinances.

As an alternative to discharging treated water into a water stream or the like, recycling of the waste back into the processing system provides a cost efficient system. However, in order to recycle such waste water, the solids content and so forth must be effectively removed in order to provide pure water back into the system. Accordingly, the same concerns that are present with respect to the removal of such solids for EPA standards exist for recycling purposes as well.

One of the most effective methods of removing fat, blood, tissue and other solids in waste waters is through the use of chemical aids. Historically, dry polymers and inverse emulsion latexes have been used to treat food processing water. Each material has its own advantages and disadvantages. While dry polymers have the benefit of being extremely concentrated, thereby reducing shipping costs, the equipment to dissolve the polymers is expensive and is not available to all end-users on site. Dry polymers also have a large extent of cross-linking; thus, insoluble, gel materials are present.

Latex polymers also suffer from problems but are used quite frequently. Latex polymer preparations commonly include 30–35% polymer solids dispersed in oil. The latex polymer must be also inverted prior to use. Numerous problems associated with this feeding method have caused many customers to avoid latex polymers. In addition, the latexes generally have a very narrow treating range, often resulting in over-treatment at higher dosages.

Chemicals such as polyethylene oxide, polyethylene amine, and copolymers of acrylamide and quaternized acrylates are specific types of chemical treatments that have been used in the food processing industry. While these chemical treatments have provided a means for removing food, blood, oil and other solids from the waste water, disadvantages exist with the use of such chemical treatments. For example, the above polymers have been traditionally synthesized in an oil solvent, thereby producing an environmentally unfriendly treatment program as well as presenting a potential fire hazard. In addition, chemical treatments incorporating the above polymers contain surfactants. Still further, these prior chemical treatments have a high toxicity thereby preventing the use of such treated waters for recycling purposes or for public drinking water supplies.

Therefore, a need exists for a treatment system that addresses all the environmental concerns presented by food processing waste, while at the same time being environmentally friendly.

SUMMARY OF THE INVENTION

The present invention provides a method for conditioning food processing waste prior to mechanical dewatering with the use of environmentally friendly flocculants. The method of the present invention utilizes a dispersion of water-soluble cationic polymers which are synthesized entirely in water, eliminating the need for an oil solvent of any sort.

In an embodiment, the method of the present invention comprises the step of adding an effective amount of a dispersion of water-soluble cationic polymer flocculant, either neat or as a dilute solution, to the food processing waste. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

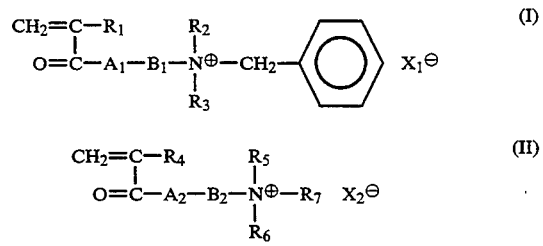

wherein $R_1$ and $R_4$ are each H or $CH_3$; $R_2$, $R_3$, $R_5$, $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$- and $X_2$- are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The multivalent anionic salt preferably comprises a phosphate, a sulfate or a mixture thereof.

In one embodiment, the effective amount of the dispersion polymer flocculant added to the food processing waste is from about 1–60 pounds based on polymer actives for one dry ton sludge solids treated. This can vary due to the particular constituents of the waste stream, their concentrate, age, etc.

In an embodiment, the method of the present invention includes the further step of adding an effective amount of at least one coagulant to the food processing waste. The coagulant effectively agglomerates a portion of the colloidal organic solids into suspended solids.

In an embodiment, the method of the present invention includes the further step of adding an effective amount of at least one precipitant to the food processing waste. The precipitant effectively facilitates the removal of unwanted chemicals from the food processing waste.

An advantage of the present invention is that it utilizes dispersion polymers that contain no oil or hazardous ingredients and therefore do not contribute adversely to the impact of the food waste on the environment. Instead, the dispersion polymers of the present invention are synthesized entirely in water, eliminating the need for special activators.

Another advantage of the present invention is that the dispersion polymers are easily diluted. As a result, the expenditure on dosing equipment is kept to a minimum.

Another benefit of the invention over other commercial treatment programs is the effectiveness at sequestering the fat in the sludge. By tying up the fat better, dispersion polymers maintain their drainage volume for a longer period of time.

Moreover, an advantage of the present invention is that the bulk viscosity of the dispersion polymers is low, unlike some oil dispersion latex polymers. This physical property enables any standard chemical pump to deliver the material at the injection site.

Still further, an advantage of the present invention is that it not only conditions the food processing sludge prior to mechanical dewatering, it also clarifies the food processing waste.

Yet another advantage of the present invention is that it provides a complete treatment system that meets the environmental concerns presented by food processing wastes.

Additional features and advantages of the present invention are described in, and will be apparent from, the detailed description of the presently preferred embodiments and the Figures.

BRIEF DESCRIPTION OF THE DRAWINGS

FIG. 2 describes the effect of dispersion polymer in maintaining belt cleanliness with about 15% reduction in the drainage over a cycle of 10 experiments. Later polymer loses 60% effectiveness.

DETAILED DESCRIPTION OF THE PRESENTLY PREFERRED EMBODIMENTS

Figure 1:
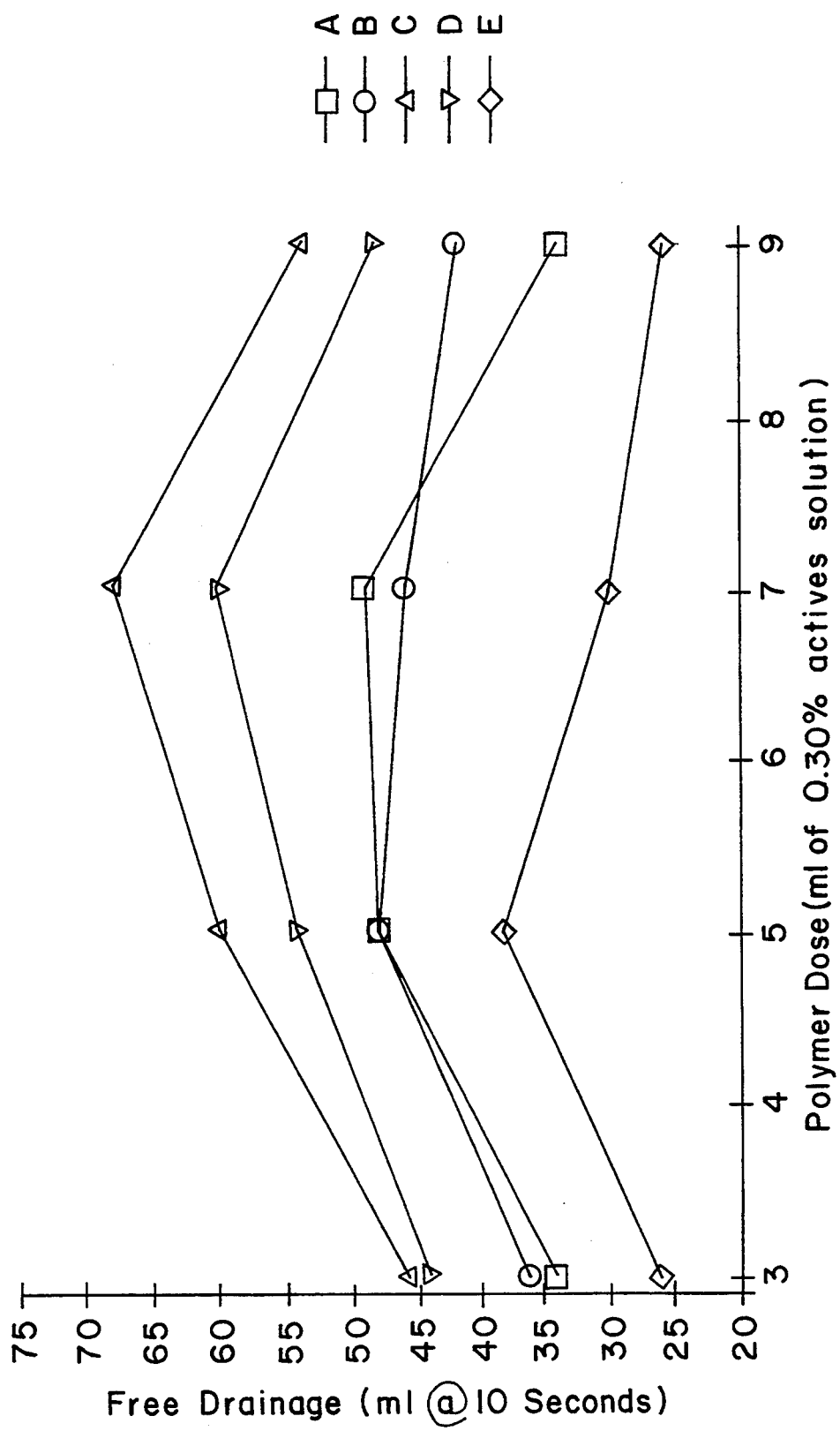
FIG. 1 illustrates graphically comparative results of polymer dosage (ml of 0.30% actives solution) versus filtrate volume (mls) for the treatment of food processing waste with various dispersion polymer flocculants as well as conventional latex polymers.

The present invention provides, for conditioning food processing waste, a method that includes the addition of a dispersion polymer flocculant to the food processing waste. The invention provides a superior method for removing fat, blood, tissue, and the like from food processing waste. The water-soluble dispersion polymers of the present invention have been discovered to be more effective in removing such products from food processing waste than currently available chemical treatments. The polymer dispersions of the invention achieve fine particle sizes and aqueous solubilities not available with other polymers used for this application.

The dispersion polymers of the invention offer numerous advantages that have previously been unavailable to operators of food processing systems. The polymers are synthesized entirely in water and, unlike latex polymers, no oil solvent is required. As a result, the polymers do not present a fire hazard. Moreover, since oil is not added to the water that is to be treated, the end resulting water is more environmentally friendly. Still further, dissolution of the polymer requires only the addition of water, thereby eliminating the need for special activators. The ability of these materials to dissolve/invert is superior to that of oil dispersion latexes. In addition, the polymers may be diluted to virtually any concentration by using appropriately concentrated salt water.

Unlike latex polymers currently used in treating food processing wastes, the dispersion polymers are hydrophobic, and thus very active at the air/water or oil/water interface. Performance benefits seen with dispersion polymers, compared to that of latex polymers are relatively unexpected.

One example of the dispersion polymers of the invention may be obtained from HYMO Corporation, Japan. Preferred polymer preparations are available from HYMO Corporation under the trade name designations DR-2570, DR-3000 and DR-4000. Methods for manufacturing the polymer dispersions used in the invention are described in detail in U.S. Pat. Nos. 5,006,590 and 4,929,655, assigned to Kyoritsu Yuki Co., Ltd., Tokyo, Japan. The disclosures of these two patents are incorporated herein by reference.

According to the invention, in a preferred embodiment, the polymer dispersion used to treat the food processing water is prepared from a water-soluble monomer mixture containing at least 5 mole % of a cationic monomer represented by the general formula (I):

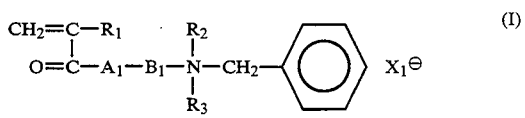

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

In an embodiment, the above cationic monomer represented by the general formula (I) is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, diethylaminoethyl methacrylate, diethylaminopropyl methacrylate, and dimethylaminopropyl methacrylamide.

Suitable monomers that may be polymerized with the cationic monomer represented by the general formula (I) include acrylamide, methacrylamide and the cationic monomers represented by the general formula (II):

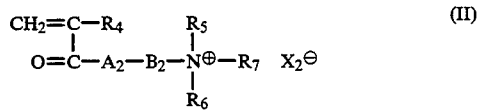

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Suitable monomers represented by the formula (II) include the ammonium salts or dimethylaminoethyl acrylate, diethylaminoethyl acrylate, dimethylaminopropyl acrylamide, diethylaminopropyl acrylamide, dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. In preferred embodiments, the cationic monomers represented by the general formula (II) are the salts and methylated quaternary salts of dialkylaminoethyl acrylate and dialkylaminoethyl methacrylate. In an embodiment, the concentration of the above-mentioned monomers in the polymerization reaction mixture is in the range of 5 to 30% by weight.

In preferred embodiments, the polyvalent anionic salt to be incorporated in the aqueous solution according to the present invention is a sulfate, a phosphate or a mixture thereof. Suitable salts include ammonium sulfate, sodium sulfate, magnesium sulfate, aluminum sulfate, ammonium hydrogen phosphate, sodium hydrogen phosphate and potassium hydrogen phosphate. In the present invention, these salts may be used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. In an embodiment, the dispersant polymer is used in an amount of from 1 to 10% by weight based on the total weight of the monomers. The dispersant polymer is composed of 20 mole % or more of cationic monomer units represented by the formula (II). In other embodiments, the residual mole % is acrylamide or methacrylamide. The molecular weight of the dispersant is in the range of 10,000 to 10,000,000. According to one embodiment of the invention, a multifunctional alcohol such as glycerin or polyethylene glycol is coexistent in the polymerization system. The deposition of the fine particles is smoothly carried out in the presence of these alcohols.

For the polymerizations a usual water-soluble radical-forming agent can be employed. In a preferred embodiment, water-soluble azo compounds such as 2,2′-azobis(2-amidinopropane) hydrochloride and 2,2′-azobis(N,N′-dimethyleneisobutylamine) hydrochloride are used.

In an embodiment, the method of the present invention includes the further step of adding an effective amount of a coagulant to the food processing waste. The coagulant component of the present invention leads to the direct agglomeration of colloidal organic solids to suspended solids. The active coagulant neutralizes charge on the surface of suspended solids, increasing settlement rate and facilitating flocculation. In addition, the coagulant component promotes co-precipitation of dissolved solids onto the suspended solids template, reducing soluble biological and chemical oxidation demands of the final treated effluent.

Examples of suitable coagulants that may be used in the present invention include: ferric sulfate, ferrous sulfate, aluminum sulfate, aluminum chloride, polyaluminum chloride, ferrous chloride, ferric chloride, aluminum chlorohydrate, ethylene-dichloride/ammonia polymers, melamine/formaldehyde polymers, and epichlorohydrin-dimethylamine condensation polymer in liquid form; poly-diallyldimethyl ammonium chloride in liquid or solid form; and mixtures thereof.

In an embodiment, the method of the present invention includes the further step of adding an effective amount of a precipitant to the food processing waste. The precipitant component of the present invention facilitates the removal of unwanted chemicals within the final effluent. Naturally, the particular type of precipitant chosen depends on the particular constituent that is to be removed from the food processing waste.

Pursuant to the method of the present invention, food processing waste can be purified and an environmentally friendly water is simultaneously obtained. In an embodiment, the method of the present invention involves the addition of at least one dispersion polymer flocculant to the food processing waste. While the sole addition of the dispersion polymer flocculant effectively conditions the food processing waste prior to mechanical dewatering, the combined addition of a coagulant and precipitant provides a complete chemical treatment method.

The optimal amounts of the various components required for effectiveness in this invention depend on the type of food processing waste being treated. In addition, the concentration of the combined components varies greatly and can depend upon the conditions such as temperature and pH of the food processing waste.

According to the method, the polymers of the present invention are added to a food processing waste water stream. In an embodiment, the polymers are added in an effective amount of from 1 to 60 lbs. for one ton dry solids sludge treated. In a more preferred embodiment, the polymers are added in an effective amount of from 5 to 50 lbs. for one ton dry solids sludge treated. In the most preferred embodiment, the polymers are added in an amount of from 10 to 40 lbs. for one ton dry sludge treated.

The dispersion flocculants of the present invention can be applied to food processing waste slurry, stored or screened solids, or to filtrate produced by dewatering. In an embodiment, the flocculant is directly injected into the food processing waste. The flocculant may be added with or without a dilution system. The polymers of the invention are preferably added to the system in neat form. However, in some applications, the polymers can be added as an aqueous solution. The active polymer bridges suspended solids leading to optimal dewatering of solids as well as optimal clarification of filtrate liquors.

Once the polymers of the invention are added to the waste water stream, the treated water is naturally agitated as it moves through the process stream of the food processing plant. The polymers of the invention will cause the fat, blood, tissue and the like to separate from the water and float to the surface of the water as a floc. The floc is subsequently removed from the surface of the water and handled further. The treated water can now be discharged either into a river, lake or recycled into an industrial process.

As stated above, for a complete chemical treatment system, a coagulant and a precipitant may also be added to the food processing waste water. In an embodiment, the coagulant component of the present invention is added in an effective amount of from 0.01 to 2 lbs. per one ton dry solids sludge treated. Whereas, in an embodiment, the precipitant component of the present invention is added in an effective amount of from 1 to 60 lbs. per one ton dry solids sludge treated. The coagulant portion of the present invention is preferably applied to the filtrate produced by dewatering of the food processing waste slurry, or to food processing waste. The precipitant portion of the present invention is preferably applied neat direct to the filtrate or food processing waste. The precipitants not only facilitate the removal of unwanted chemicals but also allow optimal flocculation and settlement of solids.

Another benefit of the invention over other commercial treatment programs is the effectiveness at sequestering the fat in the sludge. By tying up the fat better, dispersion polymers maintain their drainage volume for a longer period of time.

By way of example, and not limitation, experimental examples of the present invention will now be given.

EXAMPLES

The dispersion of the water-soluble cationic polymers of the present invention were tested in two waste streams. Appropriate waste samples were obtained from two different facilities. A description of each is given below in Table 1.

TABLE 1

| Facility | Substrate Tested |
| --- | --- |
| Chicken Processing Plant #1 | Chicken processing sludge |
| Chicken Processing Plant #2 | Chicken Processing DAF Float |

The results for each set of testing are discussed individually below in respective examples. The chemical treating agents were added at the listed dosages. All Nalco designated products are available from Nalco Chemical Company, Naperville, Ill. Other commercial products are available as designated.

In Examples 1 and 2, the ability of products to facilitate dewatering was evaluated using the "free drainage test" that simulates conditions in the free drainage area on a twin belt press. The free drainage test was conducted as follows: two hundred milliliters of sludge was measured into a 500 ml graduated cylinder. The appropriate amount of a polymer solution was then added. The graduated cylinder was then capped and inverted 5 times to mix the sludge/polymer and promote flocculation. The sludge sample was then poured onto a piece of belt fabric from a twin belt press and the free drainage was measured as a function of time.

Example No. 1

Experiments were conducted on DAF float samples obtained from a chicken processing plant.

FIG. 1 illustrates graphically comparative results of polymer dosage (volume of 0.30% actives solution) versus filtrate volume (mls) for the treatment of the waste sample with various different dispersion polymer flocculants: "A" is an acrylamide/DMAEM.MSQ copolymer latex polymer; "B" is a non-latex acrylamide/DMAEA.MCQ copolymer; "C" is a dispersion polymer of the invention DR-4000; "D" is a dispersion polymer of the invention DR-3000; "E" is a dry acrylamide/DMAEA.MCQ copolymer. The graph illustrates that the best products for this sludge sample were the water dispersion polymers of the invention which is HYMO DR-4000 and DR-3000 obtained from Hymo Chemical Company, Japan.

Example No. 2

Another experiment was conducted on waste samples obtained from another chicken processing facility. The waste samples consisted of chicken processing sludge. Three water dispersion polymers of the invention matched or bettered the activity of the industrial standard for this application.

Example 3

200 ml of DAF float was treated with 7 ml of 0.3% actives of dispersion polymer B (DR-3000). Free drainage was measured. The belt fabric was rinsed off with water and washed with soap. The same experiment was repeated for ten cycles.

In another series of testing, a latex polymer A (AcAm/DMAEA.MCQ) was used at the same dosage (7 ml of 0.3% actives). Free drainage was measured as in the case of the dispersion polymers. In FIG. 2, free drainage is plotted for each cycle of experiments. An increase of about 15% free drainage effectiveness was observed with dispersion polymers, while latex polymers lost about 60% effectiveness for the same number of cycles.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications are covered by the appended claims.

We claim:

1. A method for flocculating food processing waste composed of fat, blood, oil and tissue prior to mechanical dewatering comprising the steps of treating the food processing waste sludge with an effective amount of at least one dispersion of a water soluble cationic polymer flocculant, said dispersion of the water-soluble cationic polymer being prepared by polymerizing a water-soluble monomer mixture containing at least 5 mole % of a cationic monomer represented by general formula (I) and at least 5 mole % of acrylamide or methacrylamide in aqueous solutions of a polyvalent anionic salt, wherein the polymerization medium contains a dispersant polymer, said dispersant polymer being a water-soluble cationic polymer which is soluble in said aqueous solution of the polyvalent anionic salt and which contains at least 20 mole % of cation monomer units represented by a general formula (II):

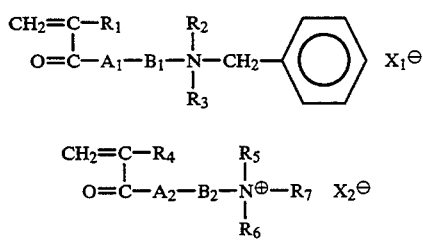

wherein $R_1$ and $R_4$ are each H or $CH_3$, $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1^-$ and $X_2^-$ and are each a counter anion to flocculate said fat, blood, oil, and tissue; and b) mechanically dewatering the flocculated fat, blood, oil, and tissue.

2. The method of claim 1 wherein the water-soluble monomer mixture further contains at least 5 mole % of a cationic monomer represented by the general formula (II).

3. The method of claim 1 wherein said polyvalent anionic salt comprises a phosphate, a sulfate or a mixture thereof.

4. The method of claim 1 wherein the effective amount of the dispersion of the water-soluble cationic polymer added to the food processing waste sludge is at least one lb. per one ton dry solid sludge treated.

5. The method of claim 1 wherein the effective amount of the dispersion of the water-soluble cationic polymer added the food processing waste sludge is at least 10 lbs. per one ton dry solids sludge treated.

6. The method of claim 5 wherein the effective amount of the dispersion of the water-soluble cationic polymer added to the food processing waste sludge is at least 40 lbs. per one ton dry solids sludge treated.

7. The method of claim 1 including the further step of adding an effective amount of at least one coagulant to the food processing waste sludge to convert colloidal solids into suspended solids.

* * * * *

UNITED STATES PATENT AND TRADEMARK OFFICE
CERTIFICATE OF CORRECTION

PATENT NO. : 5,451,326
DATED : SEPTEMBER 19, 1995
INVENTOR(S) : WAYNE M. CARLSON & MANIAN RAMESH

It is certified that error appears in the above-indentified patent and that said Letters Patent is hereby corrected as shown below:

COLUMN 8, CLAIM 1, LINE 63

A method for flocculating feed processing waste should read--

A method for flocculating food processing waste sludge --.

COLUMN 9, CLAIM 1, LINE 6 rylamide in aqueous solutions of a polyvalent anishould read -- rylamide in an aqueous solution of a polyvalent ani- --.

UNITED STATES PATENT AND TRADEMARK OFFICE
CERTIFICATE OF CORRECTION

PATENT NO. : 5,451,326
DATED : SEPTEMBER 19, 1995
INVENTOR(S) : WAYNE M. CARLSON & MANIAN RAMESH

It is certified that error appears in the above-indentified patent and that said Letters Patent is hereby corrected as shown below:

COLUMN 10, CLAIM 5, LINE 18 polymer added the food processing waste sludge is at should read-- polymer added to the food processing waste sludge is at--.

Signed and Sealed this

Twelfth Day of December, 1995

Attest:

BRUCE LEHMAN

Attesting Officer

Commissioner of Patents and Trademarks